(12) United States Patent
Pörtner

(10) Patent No.: US 12,123,710 B2
(45) Date of Patent: Oct. 22, 2024

(54) METHOD FOR MEASURING THE WALL THICKNESS OF A HOLLOW GLASS ARTICLE

(71) Applicant: Heye International GmbH, Obernkirchen (DE)

(72) Inventor: Dirk Pörtner, Helpsen (DE)

(73) Assignee: Heye International GmbH, Obernkirchen (DE)

(*) Notice: Subject to any disclaimer, the term of this patent is extended or adjusted under 35 U.S.C. 154(b) by 964 days.

(21) Appl. No.: 16/984,833

(22) Filed: Aug. 4, 2020

(65) Prior Publication Data

US 2021/0041233 A1 Feb. 11, 2021

(30) Foreign Application Priority Data

Aug. 6, 2019 (DE) ................. 10 2019 005 487.3

(51) Int. Cl.
*G01B 21/08* (2006.01)
*C03B 9/41* (2006.01)
*C03B 35/04* (2006.01)
*C03B 35/06* (2006.01)
*G01N 21/90* (2006.01)

(52) U.S. Cl.
CPC ............. *G01B 21/085* (2013.01); *C03B 9/41* (2013.01); *C03B 35/04* (2013.01); *C03B 35/06* (2013.01); *G01N 21/90* (2013.01); *G01N 2021/9063* (2013.01)

(58) Field of Classification Search
None
See application file for complete search history.

(56) References Cited

U.S. PATENT DOCUMENTS

| | | | | |
|---|---|---|---|---|
| 3,356,212 | A * | 12/1967 | Landin | B07C 5/126 |
| | | | | 209/526 |
| 5,437,702 | A | 8/1995 | Burns et al. | |
| 6,188,079 | B1 * | 2/2001 | Juvinall | G01B 21/085 |
| | | | | 250/559.27 |
| 2011/0141264 | A1 | 6/2011 | Holtkamp et al. | |
| 2015/0076353 | A1 | 3/2015 | Bathelet | |
| 2015/0142163 | A1 * | 5/2015 | Simon | G01N 21/90 |
| | | | | 700/158 |
| 2019/0300416 | A1 * | 10/2019 | Simon | C03B 7/005 |
| 2022/0244039 | A1 * | 8/2022 | Leconte | G01B 21/085 |

FOREIGN PATENT DOCUMENTS

EP 2873652 A1 5/2015

* cited by examiner

*Primary Examiner* — Lisa L Herring
(74) *Attorney, Agent, or Firm* — Dority & Manning, P.A.

(57) ABSTRACT

A method is provided for measuring the wall thickness of hollow glass articles in a hollow glass production system, wherein the IR radiation emitted by each hollow glass article exiting the hot end of a glass forming machine is detected at least in areas mapped by a function, the same hollow glass article, after having passed through an annealing lehr, being measured in the circumferential direction with respect to a wall thickness distribution, and the detected wall thickness distribution being mapped by a function. Using correlation methods, it is checked whether the progression of the function is contained in the function, wherein if so, measured values of the wall thickness can be associated with the measured values of the IR radiation at the hot end, so that the wall thickness distribution of the hollow glass article is already known at the hot end and implementable for monitoring purposes.

6 Claims, 7 Drawing Sheets

METHOD FOR MEASURING THE WALL THICKNESS OF A HOLLOW GLASS ARTICLE

The present application is based on and claims priority to German Application Serial No. 10 2019 005 487.3 having a filing date of Aug. 6, 2019, which is incorporated by reference herein.

The invention relates to a method for checking a circumferential distribution of a wall thickness of a hollow glass article in a hollow glass production system with a hot end and a cold end comprising at least one glass forming machine with an exit being at the hot end of the hollow glass production system and a device for thermally treating hollow glass articles, the device for thermal treatment comprising an entrance and an exit arranged downstream of the glass forming machine in a passage direction of the hollow glass article, the hollow glass production system further comprising devices for transporting the hollow glass article from the exit of the at least one glass forming machine to the entrance of the device for thermal treatment and leading away from the exit of the device for thermal treatment, at least one IR camera being arranged at the hot end for recording areas of a distribution of a thermal overall radiation emitted by the hollow glass articles.

The production of hollow glass articles on an individual section (IS) machine, for example, is characterized by a continuously progressing glass forming process, wherein, proceeding from a number of molten glass drops provided in a portioned manner, in a blank mold initially a blank, the so-called parison, and from this thereafter, in a blow mold, an end product are created in a two-stage process. The end product, namely a hollow glass article, passes through an annealing lehr with the aid of a conveyor belt, wherein several processing stages, coating or also sealing the surface, may follow. The exit of the annealing lehr forms the start of the cold end of the glass production system. At the time of leaving the blow mold, this being at the hot end of the hollow glass production system, the article undergoes a continuous loss of heat and still has to be checked for the possible presence of production defects. The forming process in high volume production essentially takes place according to a defined chronological sequence, so that only a comparatively short period of time is available for the actual checking process of a hollow glass article. The criteria underlying such a check relate to the dimensional accuracy and, in particular, the mass distribution of the article, the rotational symmetry thereof with respect to the longitudinal axis thereof, including the angular orientation thereof with respect to a vertical, and finally the freedom from defects of the glass material. Defects that may occur are inclusions of foreign matter, gas bubbles, cracks of a vertical and horizontal kind, structural disturbances or anomalies in the surface area, internal stress areas and the like.

In any case, the finished product of this forming process is influenced by a plurality of settings of machine parameters, and for quality assurance reasons, there is great interest in associating the particular set of parameters, including the respective used production station and/or the used blank and blow molds, with each produced hollow glass article, so as to be able to detect and correct potentially faulty settings or states early on. An important prerequisite in this regard is that each produced hollow glass article is provided with a coding, based on which it is possible to establish an association of process and test data. The used blank and blow molds as well as the production time are to be considered to be included in this data as well. In any case, hollow glass articles having test values that deviate from the target values to a degree that is no longer tolerable are sorted and discarded as scrap.

One important parameter of a hollow glass article to be checked is the uniformity of the circumferential wall thickness distribution thereof, seen in the circumferential direction. Information regarding this parameter should be obtained at the earliest possible point in time during the sequence of the production process so as to be able to intervene as quickly as possible in the event that anomalies occur.

It is known to check the circumferential wall thickness progression on a hollow glass article rotating about the longitudinal axis thereof at the cold end. A check at the hot end, using the same checking procedure, is not possible, taking the temperature-related low mechanical stability of the hollow glass articles into consideration. Deviations in a target wall thickness distribution point to problems in the glass homogeneity as well as, in general, in the forming process, which per se require a rapid response, with the goal of eliminating these deviations. Detecting these deviations not until the cold end therefore occurs at a comparatively late point in time due to the time period primarily for a passage through the annealing lehr.

It is furthermore known to use IR cameras at the hot end, which convey a distribution of the overall radiation of a hollow glass article view, which is assumed to be at least influenced by the wall thickness distribution. A method for improving the product quality of a system for producing hollow glass articles is known from EP 2 873 652 A1, for example, which is dependent on measurements of the emitted thermal radiation by way of an IR camera as well as the wall thickness at the hot end of a hollow glass production system. Detecting a circumferential distribution of the wall thickness at the hot end, however, is problematic, as mentioned above, in view of the mechanical stability of the hollow glass articles still being too low at this point. This at least limits or reduces the speed with which the articles pass through.

It is therefore the object of the invention to design a method of the type mentioned at the outset to the effect that information about the wall thickness distribution of a hollow glass article is available at an earliest point in time. This object is achieved in such a method by: ascertaining a circumferential rotational angle-dependent measurement of the distribution of the wall thickness of a hollow glass article at the cold end; measuring the circumferential distribution of the overall radiation of the hollow glass article at the hot end; and associated the measurement of the circumferential distribution of the overall radiation with the measurement of the circumferential distribution of the wall thickness at the cold end to establish a functional dependence between values obtained by the measurements of the distributions of the overall radiation and the wall thickness to identify a wall thickness progression based on the overall radiation at the hot end.

It is essential to the invention that, at the hot end of the hollow glass production system, an IR image of the distribution of the overall radiation emitted by the hollow glass article is recorded, which is carried out, for example, by multiple IR cameras on both sides of the conveyor belt on which the hollow glass articles are sitting. The hollow glass article whose overall radiation has been recorded thereafter passes through a device for thermal treatment, for example an annealing lehr, and at the exit thereof reaches the cold end of the hollow glass production system. Here, a circumferential distribution of the wall thickness of the hollow glass article is conventionally measured and recorded, wherein both images, these being that of the IR radiation and that representing the wall thickness distribution, are recorded in a time- and/or article-based manner. The two recorded images are thus temporally offset by the time period of the passage through the annealing lehr. Despite the temporal offset, it is assumed that the values of the wall thickness distribution recorded at the cold end and the values of the IR radiation, or of the overall radiation, recorded at the hot end have a functional dependence on one another, so that it is possible, taking this temporal offset into consideration, to calibrate the values recorded at the hot end in accordance with the wall thickness. The invention is thus based on checking a correlation between the progressions of the values of the overall radiation and those of the wall thicknesses, and more particular based on a hollow glass article, so that in any case the radiation values ascertained at the hot end can be associated with the values of the wall thickness. In this way, an earliest possible measurement of the wall thickness distribution within the scope of the production process of the hollow glass article is provided. If needed, this already allows a correction of the wall thickness distribution in accordance with a target value at the hot end, which can be carried out easily and quickly.

According to example aspects of the present disclosure, the values of the radiation at the hot end and of the wall thickness progression at the cold end are each recorded in a time-based manner. Using the run time to be expected from the location of the IR cameras to the cold end as a basis, this allows the two aforementioned values to be associated with one another in each case based on a defined hollow glass article, and thus allows the wall thickness progression to be checked already at the hot end. So as to compensate for a lack of definition, a mean value can be found of the IR radiation values and of the measured values of the wall thickness over a defined period of time, for a mold number. The wall thickness values thus measured should be checked cyclically and updated if needed.

According to example aspects of the present disclosure, each hollow glass article is provided with an individual marking, which is generated at the hot end and can be read out at the cold end. In addition to individual data of the particular hollow glass article, this marking can also include process data of the production process. This circumstance can also be used to identify a certain hollow glass article at the cold end, wherein due to a time-based storage of the values of the radiation and of the values of the wall thickness progression, in conjunction with the marking, it is possible to unambiguously associated the values of the wall thickness with the values of the radiation.

According to example aspects of the present disclosure, the values of the wall thickness progression at the cold end and of the overall radiation at the hot end are in each case represented by graphs or functions. So as to check whether agreements exist in the recorded functions, correlation methods are applied to these graphs in a location-offset manner, taking a time offset into consideration, since it has to be possible to find the progression of the values recorded at the cold end in the progression of the values recorded at the hot end in the event of an agreement. If an agreement exists, the values of the radiation can be associated in the respective associated graph at the hot end with the values of the wall thickness, so that a function can already be generated for the hot end, based on a hollow glass article, which makes it possible to ascertain values relating to the wall thickness or wall thickness progression.

The information describing the wall thickness progression thus ascertained at the hot end according to example aspects of the present disclosure can be represented in a variety of forms. It is used, among other things, to carry out monitoring functions for the operation of the hollow glass production system. It is particularly advantageous in this connection that this information is available at an earliest possible point in time, so that it can be used in a variety of ways.

In some implementations, each IR camera is focused at the respective front sides of the particular hollow glass article facing the camera, taking the wavelength range suitable for the images into consideration. The hollow glass articles to be checked at the hot end have a temperature of approximately 300° C. to 800° C., which corresponds to a wavelength range of 5 µm to 2.5 µm. As a result of this focusing, the influence of the radiation of the back wall of the article is reduced, making a contribution to the improvement of a test result.

Example aspects of the present disclosure are further directed to different options of using the information already obtained at the hot end, which shall be understood to be mentioned solely by way of example. These options can be used hereafter, by way of example, for correctively intervening in the setting of the machine parameters, or also for ejecting hollow glass articles, which based on target parameters have deviations that can no longer be tolerated.

The invention will be described in greater detail hereafter with reference to the accompanying drawings. In the drawings.

Figure 1:
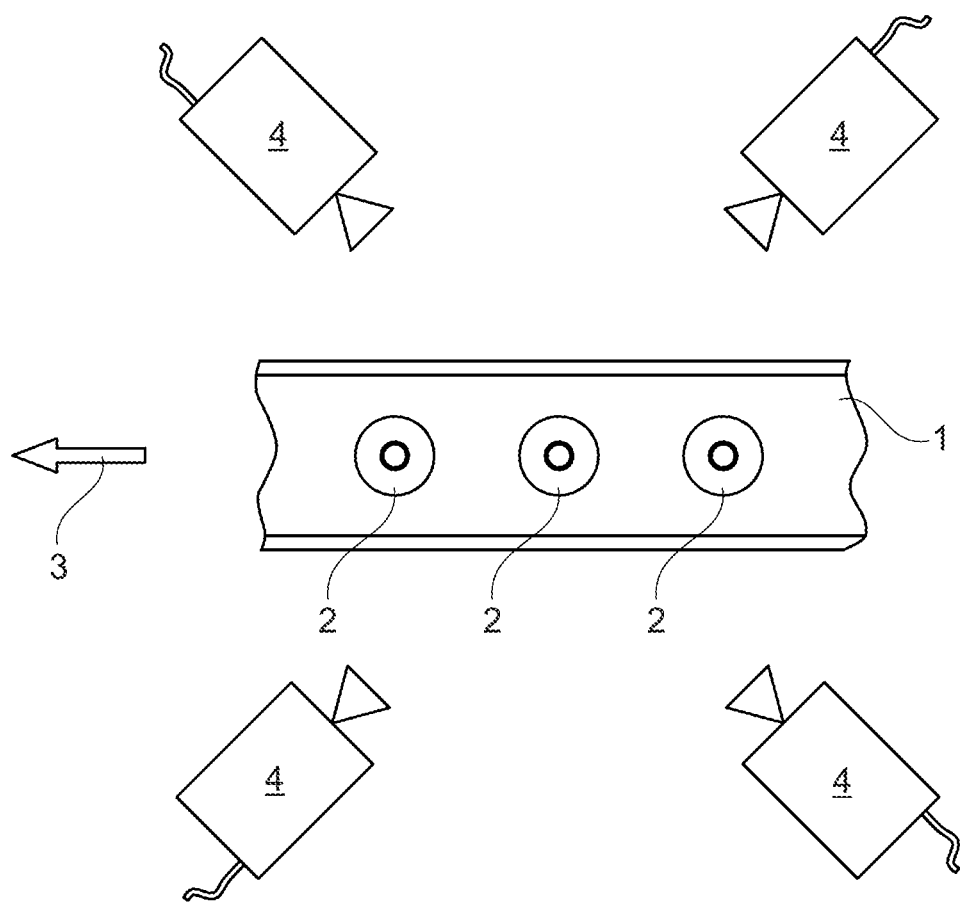
FIG. 1 shows a top view of a sensor array to be used at the hot end.

Reference numeral 1 in FIG. 1 denotes a conveyor belt, which is used at the hot end of a hollow glass production system not shown in detail and on which the hollow glass articles 2 resulting from the glass forming process are transferred, sitting vertically, in the direction of the arrow 3 to an annealing lehr, which is likewise not shown.

Four IR cameras 4 are positioned on the sides next to the conveyor belt 1, the detection ranges of which are set symmetrically with respect to a vertical longitudinal center plane of the conveyor belt 1.

Figure 3:
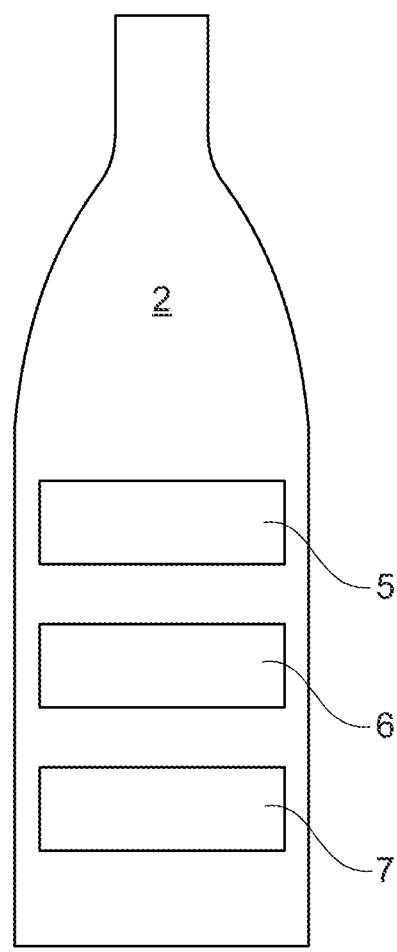
FIG. 3 shows a side view of a hollow glass article comprising the regions to be checked at the hot end.

In the top view, FIG. 3 shows three rectangular detection areas 5, 6, 7 on the circumferential region of the hollow glass article 2, of which four IR images are created by the IR camera, information about the intensity distribution of emitted IR radiation being obtained from the color depiction. As a result, the distribution of the overall radiation emitted by the hollow glass article on the front and rear sides, originating from these detection areas, are ascertained.

Figure 5:
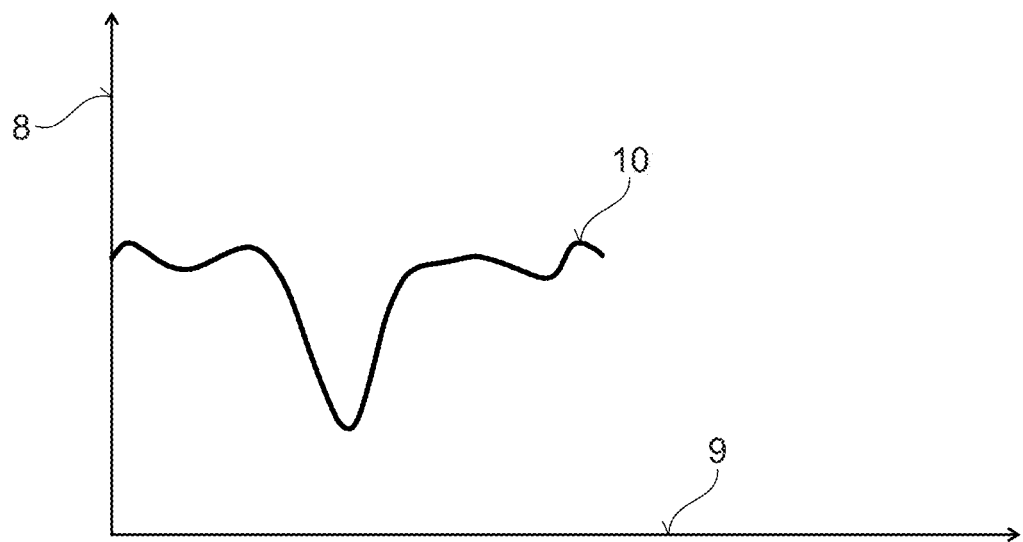
FIG. 5 shows an illustration of the intensity distribution at the hot end.

FIG. 5 shows a graph by way of example, on the ordinate 8 of which the intensity values are shown, and on the abscissa 9 of which a circumferential coordinate of the hollow glass article 2 is shown. Based on the IR images, a function 10 is represented, which depicts the intensity distribution of the thermal radiation emitted by the hollow glass article 2 as a function of the aforementioned circumferential coordinate, and from which information about the distribution of the wall thicknesses of the hollow glass article 2 at the hot end can be derived.

Figure 2:
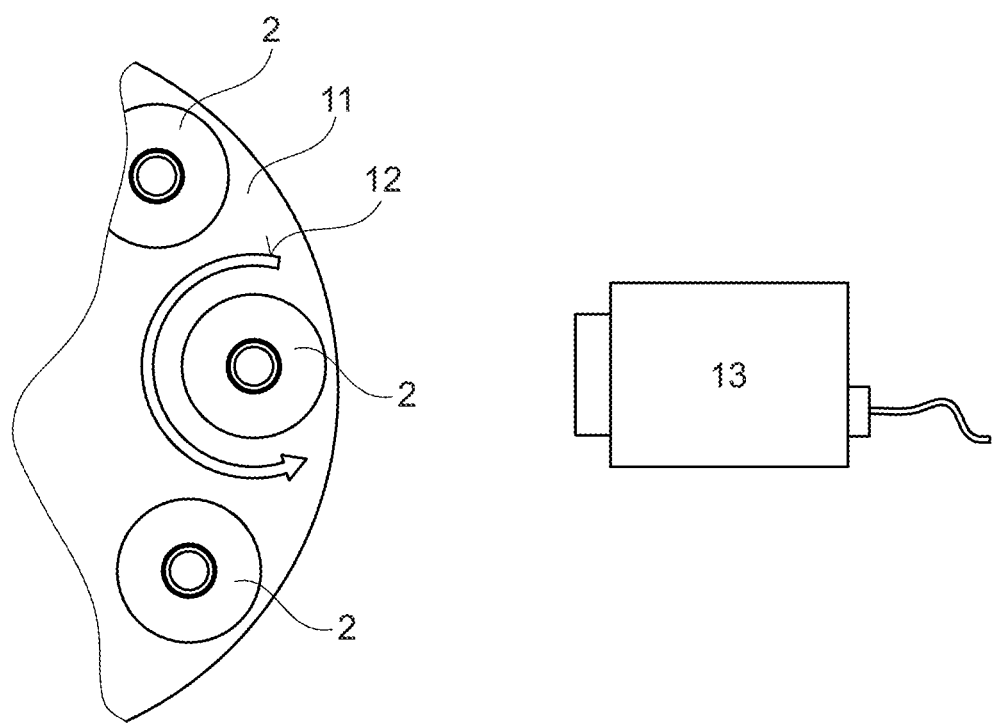
FIG. 2 shows a top view of a sensor array to be used at the cold end.

In the top view, FIG. 2 shows a rotary table 11 positioned at the cold end of the hollow glass production system, having positioned along the circumference thereof hollow glass articles 2, which have passed through an annealing lehr. The rotary table 11 is rotatably mounted about a vertical axis in the manner known per se. The hollow glass articles 2 are rotatably mounted, at the placement points thereof, about the respective vertical axes thereof in the direction of the arrow 12, and successively reach the detection range of at least one sensor 13, which is designed to measure the wall thickness distribution. Different measuring methods are employed in the process, wherein the methods of laser triangulation, confocal methods, capacitive methods and the like shall only be mentioned by way of example and are not exhaustive.

Figure 4:
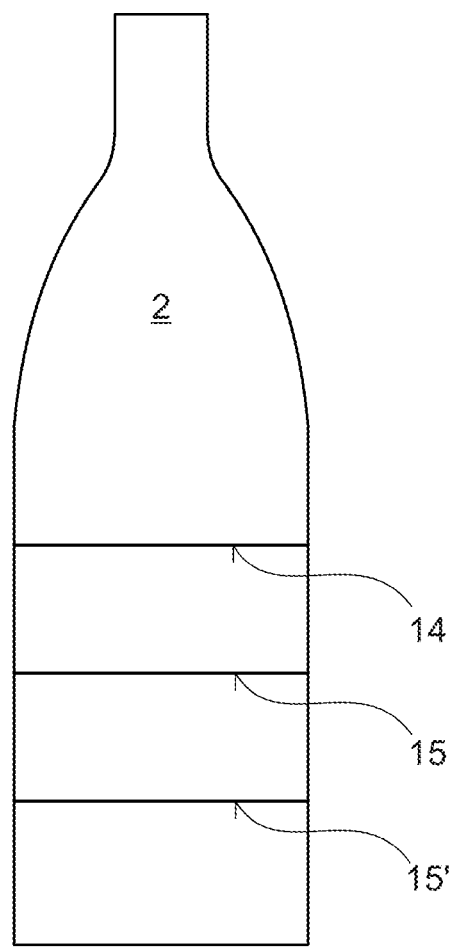
FIG. 4 shows a side view of a hollow glass article comprising the regions to be checked at the cold end.

The sensor 13 is used for an all-around measurement of the wall thickness, and for this purpose additional reference is made to the illustration according to FIG. 4, which shows measuring lines 14, 15, 15' along which the wall thickness is measured.

During a rotation of the hollow glass article about the longitudinal axis thereof, a complete development of the wall thickness distribution along the circumference is recorded. Essentially, one sensor is used along each measuring line 14, 15, 15'.

The aforementioned three measuring lines 14, 15, 15' are positioned so as to each extend through one of the detection areas 5, 6, 7.

Figure 6:
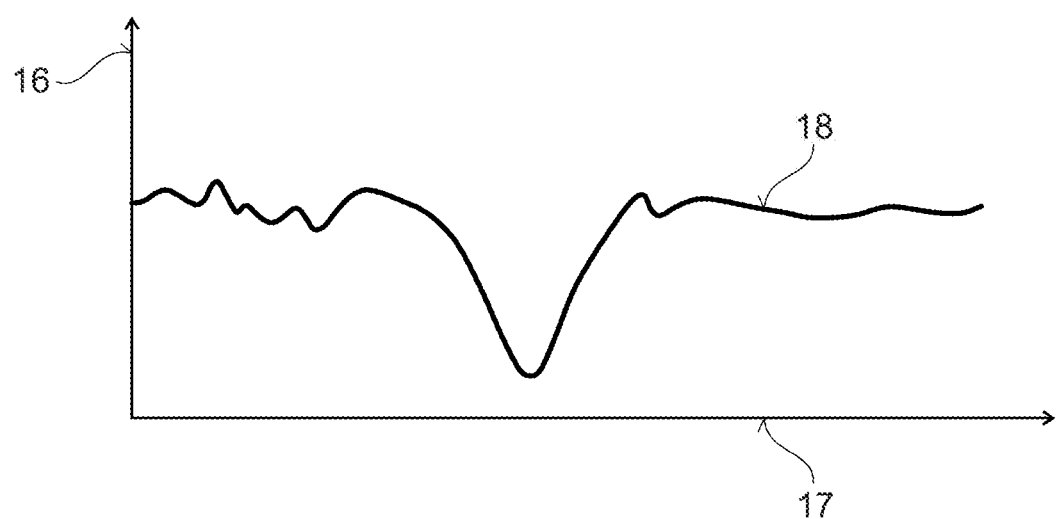
FIG. 6 shows an illustration of the wall thickness distribution at the cold end.

FIG. 6 shows a graph, by way of example, which represents the result of a complete circumferential development of a wall thickness distribution. The ascertained wall thickness is plotted along the ordinate 16, for example in mm, wherein a circumferential coordinate of the hollow glass article to be checked is plotted along the abscissa 17. This yields a function 18 that describes the ascertained relationship between these two variables.

With regard to the subject matter of the Invention, it is now assumed that the radiation distribution at the hot end corresponds at least approximately to a map of the wall thickness distribution at the cold end. A direct calibration, however, is prevented by the circumstance that a time offset exists between the functions of the radiation distribution at the hot end and the wall thickness distribution at the cold, the time offset being caused by the run time from the hot end, in the narrower sense the location of the IR cameras, to the cold end, wherein the annealing lehr is being passed through.

A mold number is associated with each hollow glass article 2, and the radiation values measured at the hot end are stored in the form of the functions 10, for example in a time-based manner. The points in time of the functions 18 of the same hollow glass article recorded at the hot end are essentially offset in relation to the corresponding point in time of the ascertained function 10 at the hot end by the degree of the annealing lehr passage time. According to the invention, the functions 18 ascertained at the cold end and indicating the circumferential distribution of the wall thickness are delayed by the annealing lehr run time in relation to the functions 10 ascertained at the hot end and indicating the distribution of the IR radiation emitted by the hollow glass articles 2. The essence of the subject matter of the invention is thus based on the pattern of the function 10 being contained in the pattern of the function 18, in relation to the individual hollow glass article 2, so that it is possible, for example by way of mathematical statistical methods of correlation, to examine the question as to whether this is in fact the case, namely whether the function 10 is in fact contained in the function 18. However, the use of other methods for checking an at least partial agreement of two functions known to the person skilled in the art is likewise possible.

Better results can be achieved by the hollow glass article 2 comprising an individual marking since it is then possible to directly associate the measurement of the overall radiation with the measured values of the wall thickness from the cold end during the correlation.

Figure 7:
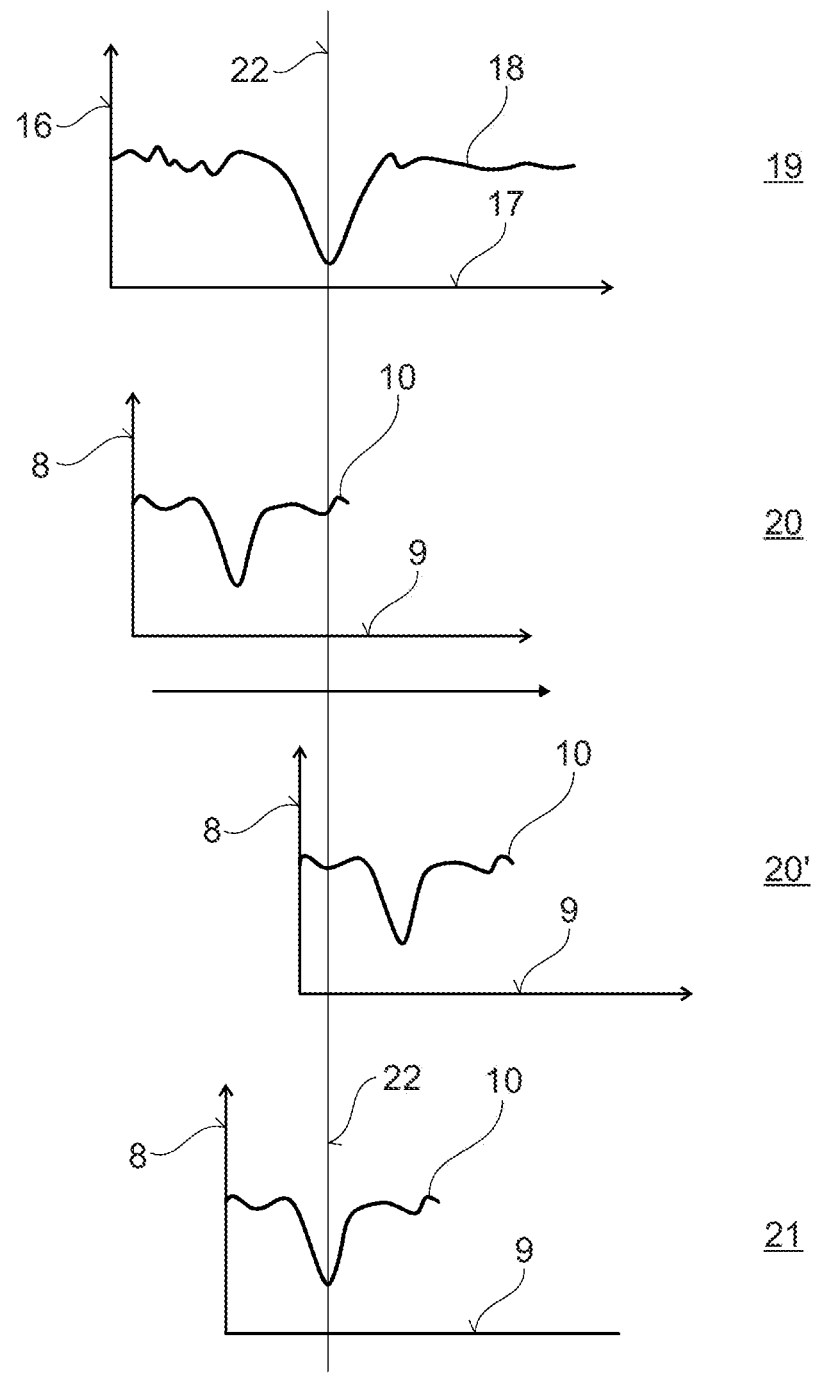
FIG. 7 shows a schematic representation of the check based on a correlation between the measurement results at the hot end and at the cold end.

In any case, the objective is to associate values of the wall thickness with the values of the function 10 so as to obtain exact information regarding the circumferential distribution of the wall thickness already at the hot end. In the event of irregularities or defects in the wall thickness distribution, this opens up the option of making changes to the production parameters of the glass forming process at the earliest possible point in time, so as to eliminate these irregularities or, if necessary, discard a hollow glass article 2 as scrap, due to deviations of the wall thickness from target values that are no longer tolerable;

Reference is made hereafter to FIG. 7 in the drawings for the illustration of a process of carrying out the correlation between the functions 10, 18. The starting point is the circumferential distribution, recorded at the cold end, of the measured wall thicknesses depicted by function 18 according to graph 19. The graphs 20, 20' showing the function 10 are shifted in an offset manner, in terms of location, along the graph 19 showing a complete circumferential development and checked with respect to a potential agreement with the graph 19, using correlation methods.

The graphs 20, 20' do not show any agreement-in contrast, the graph 21 is contained in the graph 19. This means that the graph 21 can be used to have, based on the function 10, a measured value distribution of the wall thickness of the hollow glass article already available at the hot end, building on a recorded infrared image, and, if necessary, to intervene in the setting of machine parameters of the hollow glass production system. The information about the wall thickness distribution thus obtained based on the received IR radiation subsequently has to be cyclically checked in the same manner as described above, and updated if necessary.

Reference numeral 22 in FIG. 7 denotes the position of a circumferential coordinate, which forms the starting point of a check of the graphs 20, 20' and 21 within the meaning of a correlation with the graph 19.

It is apparent that, as a result of the method according to the invention, the operator of a hollow glass production system is provided with a method for the earliest possible detection of anomalies of any kind in the circumferential wall thickness distribution.

LIST OF REFERENCE NUMERALS 1. conveyor belt
2. hollow glass article
3. arrow
4. IR camera
5. detection area
6. detection area
7. detection area
8. ordinate
9. abscissa 10. function
11. rotary table
12. arrow
13. sensor
14. measuring line
15. measuring line
15'. measuring line
16. ordinate
17. abscissa
18. function
19. graph
20. graph
20'. graph
21. graph
22. position

The invention claimed is:

1. A method for checking a circumferential distribution of a wall thickness of a hollow glass article in a hollow glass production system with a hot end and a cold end, the hollow glass production system comprising at least one glass forming machine with an exit being at the hot end of the hollow glass production system and a thermal treatment device for thermally treating a plurality of hollow glass articles, the thermal treatment device comprising an entrance and an exit arranged downstream of the glass forming machine in a passage direction of the hollow glass article, the exit of the thermal treatment device defining a start of the cold end of the hollow glass production system, the hollow glass production system further comprising transport devices for transporting the hollow glass article from the exit of the at least one glass forming machine to the entrance of the thermal treatment device and leading away from the exit of the thermal treatment device, at least one IR camera being arranged at the hot end for recording areas of a distribution of an overall radiation emitted by the plurality of hollow glass articles, the method comprising the following:

measuring a circumferential rotational angle-dependent distribution of the wall thickness of a hollow glass article of a plurality of hollow glass articles at the cold end of the hollow glass production system to determine a wall thickness distribution at the cold end;

measuring a circumferential distribution of the overall radiation of the hollow glass article at the hot end of the hollow glass production system with the at least one IR camera to determine the overall radiation at the hot end;

associating the circumferential distribution of the overall radiation at the hot end with the circumferential rotational angle-dependent distribution of the wall thickness at the cold end to establish a functional dependence between measured values obtained by the measurements of the circumferential distribution of the overall radiation and the circumferential rotational angle-dependent distribution of the wall thickness to identify a wall thickness progression based on the overall radiation at the hot end; and based on the wall thickness progression, at least one of:
setting machine parameters of the hollow glass production system; or
ejecting a particular hollow glass article.

2. The method according to claim 1, wherein the overall radiation at the hot end and the wall thickness distribution at the cold end are measured and recorded in a time-based manner and a hollow glass article-based manner, and, based on a time period required for the hollow glass article to pass through from the hot end to the cold end, the values of the overall radiation are correlated with values of the wall thickness progression.

3. The method according to claim 1, wherein each hollow glass article of the plurality of hollow glass articles are provided with an individual marking, the method further comprising:

reading out an individual marking at the cold end; and,
based on the individual marking, correlating the values of the overall radiation and the wall thickness progression in a time-based manner or a hollow glass article-based manner.

4. A method according to claim 2, wherein time-based recordings and rotational angle-based recordings of the wall thickness distribution and the overall radiation of a hollow glass article are each represented by functions, and the functions are checked for agreement by way of correlation to associate the values of the overall radiation obtained at the hot end with the values of the wall thickness progression when the values of the overall radiation obtained at the hot end and the values of the wall thickness progression are in agreement based on a temporal offset between the functions.

5. The method according to claim 4, wherein, based on the association of the values of the overall radiation with the values of the wall thickness progression, the method further comprises:

monitoring the values of the wall thickness progression arising during ongoing operation of the hollow glass production system; and
setting machine parameters of the hollow glass production system in accordance with the monitoring.

6. The method according to claim 1, wherein the at least one IR camera is focused at a front side of the hollow glass article based on a wavelength range to be recorded by the at least one IR camera, and wherein the front side of the article glass article faces the at least one IR camera.

* * * * *